Jan. 27, 1931.  A. H. NELLEN  1,790,629
PUNCTUREPROOF TIRE
Filed May 22, 1926
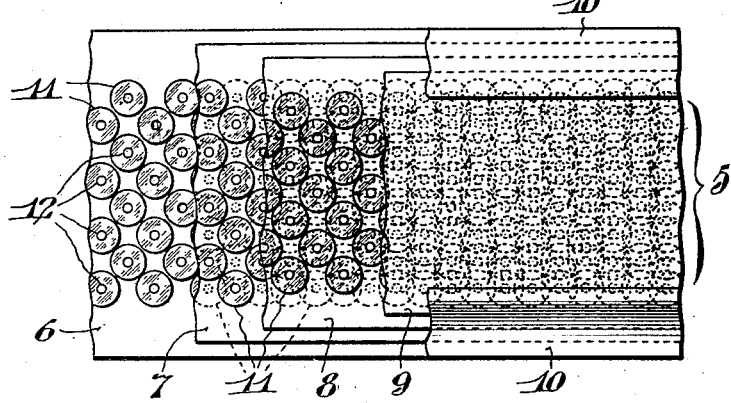
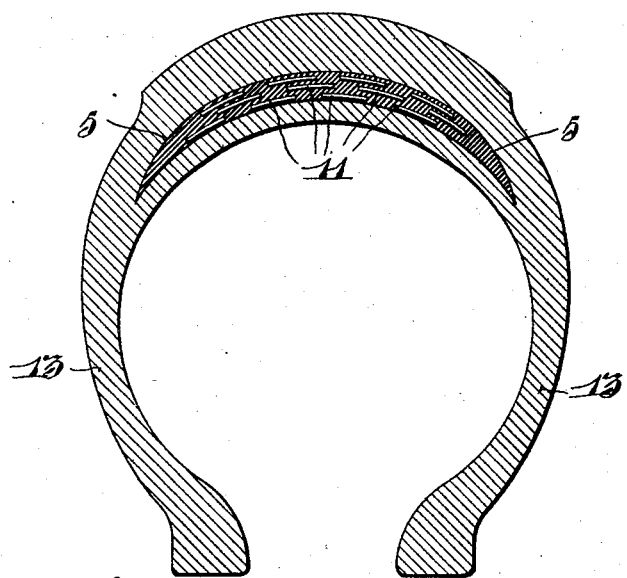
INVENTOR:
Arthur H. Nellen,
BY Fraley & Paul
ATTORNEYS.

Patented Jan. 27, 1931

1,790,629

UNITED STATES PATENT OFFICE

ARTHUR H. NELLEN, OF CONSHOHOCKEN, PENNSYLVANIA, ASSIGNOR TO LEE RUBBER & TIRE CORPORATION, OF CONSHOHOCKEN, PENNSYLVANIA, A CORPORATION OF NEW YORK

PUNCTUREPROOF TIRE

Application filed May 22, 1926. Serial No. 110,831.

This invention relates to puncture-proof tires for vehicles while it has more particular reference to that type of tire embodying an armored shield composed of layers of rubber or rubberized material with alternating plies of metal disks adhered therein. Tires of the typified character while in a measure efficient are subject to derangement in use owing to the liability of the metal disks becoming displaced relative to each other whereupon the armored shield rapidly develops puncturable places. Means have been suggested to obviate the just recited disadvantage, such as adhering the disks to the surrounding material in diverse manners but without any appreciable advantage, inasmuch as after the tire has been used more or less said disks invariably become separated from the surrounding material, work loose, and in course of time displace so that vulnerable spots susceptible to ready puncturing result.

The object of this invention is to provide a puncture-proof tire, characterized by the fact that the armoring disks or analogous elements are interlocked with the surrounding material in a manner positively preventive of their relative displacement under all normal service conditions.

With the foregoing object in view, this invention consists essentially in providing the metal disks with one or more apertures adapted to be interlocked by the encasing material; and in arranging said disks in overlapping staggered relation so that complete armored protection is positively ensured.

In the drawings:

Fig. I is a fragmentary plan view of a tire shield embodying the present improvements with the several elements relatively broken for ease in illustrating the general assemblage.

Fig. II is a sectional end view of the same.

Fig. III is a similar sectional view of the shield after cold-pressing and curing ready for incorporation in a tire; and, Fig. IV is a transverse section of a conventional tire with my improved armor shield embodied therein.

Referring more in detail to the drawings, my improved armor shield is comprehensively designated by the numeral 5; the same comprising a plurality of rubberized fabric or other superposed layers 6, 7, 8 and 9, of graduated width with longitudinally lapping reinforcements 10 of the same material, and alternating plies of steel or other suitable material disks 11 arranged in closely assembled relation, as clearly shown at the left hand of Fig. I. These disks 11, in accordance with my invention, are provided with an axial aperture 12 conveniently, though not essentially, about one-quarter of the diameter of said disks, and they are aligned in transverse rows, while the superposed plies of such disks 11 are so staggered in relation to each other that they overlap at their edges to effectively prevent puncture at any point of road traction.

After building up the armor shield 5, it will be readily seen that when it is subjected to cold-pressing and curing, the rubberized fabric or other layers 6—9 will become intimately bonded and interlocked with the disks 11 by having the material of the contacting faces thereof forced through the apertures 12, whereby said disks will be immovably retained in place.

When using disks 11, of the aforesaid type, it is necessary to space the same so that the apertures 12 therein do not coincide with those of an adjacent ply. Furthermore, by changing the size of the disk apertures 12 and varying the arrangement of the plies of disks 11, it is obviously possible to produce an armor shield 5 that will afford an impregnable puncture-proof shield, containing but three plies of such disks. Again, in some cases it may be desirable to use more or less than three plies of perforated disks 11 in making up a shield 5; or, the profile of said disks may be varied as desirable without departing from the scope of this invention.

The finished armor shield 5, made up as above set forth, is next built into the carcass of a tire 13 in accordance with common practice and the whole vulcanized into an integral unit.

From the foregoing it is thought that the advantages incident to this invention will be fully appreciated, without further elaboration herein, but it is desired to particularly stress the interlocked connection of the disks 11 with the surrounding material whereby relative displacement of the several parts is positively prevented, while the puncture-proof efficiency of the tire 13 is materially enhanced.

Having thus described my invention, I claim:

As a new article of manufacture, an armor-shield for incorporation in puncture-proof tires embodying graduated width rubberized fabric layers and strips of like material lapping the longitudinal edges thereof with alternating plies of apertured metal disks arranged in staggered relation so that the perimeters of the disks of one ply just cover the holes in a pair of those of adjacent plies to thereby prevent puncture at any point of road traction, and said rubberized fabric contacting faces wholly encasing and penetrating the apertured disks so as to securely interlock the latter to the former.

In testimony whereof, I have hereunto signed my name at Conshohocken, Pa., this 14th day of May, 1926.

ARTHUR H. NELLEN.